(12) United States Patent
Zhuang

(10) Patent No.: US 12,163,553 B2
(45) Date of Patent: Dec. 10, 2024

(54) SAFETY LOCK CATCH

(71) Applicant: WENZHOU YUANFEI PET TOY PRODUCTS CO., LTD., Wenzhou (CN)

(72) Inventor: Mingyun Zhuang, Wenzhou (CN)

(73) Assignee: WENZHOU YUANFEI PET TOY PRODUCTS CO.,LTD., Wenzhou (CN)

( * ) Notice: Subject to any disclaimer, the term of this patent is extended or adjusted under 35 U.S.C. 154(b) by 0 days.

(21) Appl. No.: 18/105,260

(22) Filed: Feb. 3, 2023

(65) Prior Publication Data
US 2023/0243385 A1 Aug. 3, 2023

(30) Foreign Application Priority Data
Dec. 12, 2022 (CN) .......................... 202211610087.5

(51) Int. Cl.
*F16B 45/04* (2006.01)
(52) U.S. Cl.
CPC .......... *F16B 45/045* (2021.05); *F16B 45/049* (2021.05); *F16B 45/053* (2021.05); *Y10T 24/4512* (2015.01); *Y10T 24/4755* (2015.01)
(58) Field of Classification Search
CPC ......... Y10T 24/45398; Y10T 24/45403; Y10T 24/4755; Y10T 24/4512; Y10T 24/45094; Y10T 24/45089; F16B 45/04; F16B 45/049; F16B 45/053; F16B 45/045
See application file for complete search history.

(56) References Cited

U.S. PATENT DOCUMENTS

| | | | | |
|---|---|---|---|---|
| 238,710 A * | 3/1881 | Perry | .................... | F16B 45/053 24/600.7 |
| 398,599 A * | 2/1889 | Fessenden | ............ | F16B 45/028 24/905 |
| 711,655 A * | 10/1902 | Clarke | .................. | F16B 45/043 24/600.7 |
| 759,806 A * | 5/1904 | Broga | .................. | F16B 45/045 24/600.7 |

(Continued)

FOREIGN PATENT DOCUMENTS

| | | |
|---|---|---|
| DE | 10305704 B3 | 6/2004 |
| EP | 2317164 A1 | 5/2011 |
| EP | 2669535 A1 | 12/2013 |

*Primary Examiner* — Robert Sandy
*Assistant Examiner* — Michael S Lee
(74) *Attorney, Agent, or Firm* — Hemisphere Law, PLLC; Zhigang Ma

(57) ABSTRACT

The invention discloses a safety lock catch, which comprises a lock body, a lock bolt, a force component and a thumb wheel; the lock body comprises a mounting portion and a hook portion, the hook portion has a first end and a second end, the first end is connected with the mounting portion, the second end is bent toward the mounting portion and there is a gap between the second end and the mounting portion, and a chamber is provided in the mounting portion; The thumb wheel is pivotally connected with the mounting portion, the thumb wheel is engaged with the lock bolt, and the lock bolt can be moved from the first position to the second position by the drive under the thumb wheel. The safety lock catch provided by the invention is not easy to fall off when used, and has better safety.

5 Claims, 17 Drawing Sheets

(56) References Cited

U.S. PATENT DOCUMENTS

| | | | |
|---|---|---|---|
| 1,679,902 A * | 8/1928 | Helwig | ................ F16B 45/049 24/600.8 |
| 2004/0159134 A1 | 8/2004 | Eichenauer | |
| 2007/0029813 A1 | 2/2007 | Eichenauer | |
| 2011/0010896 A1 | 1/2011 | Schlipper | |
| 2021/0284512 A1 | 9/2021 | Peterson et al. | |

* cited by examiner

SAFETY LOCK CATCH

TECHNICAL FIELD

The invention related to the technical field of locks or connectors, in particular to a safety lock catch, which is particularly suitable for climbing, water sports, aloft work, pet restraint and so on.

BACKGROUND OF THE INVENTION

The lock catch is mainly used to connect the rope belt to the buckle or the like from such as bags, belts, pet collars, etc., so as to build a locking connection.

FIG. 1 shows the profile of a swivel snap hook 80, comprising a hook body 81 and an anti release latch 82 supporting the sliding of the hook body 81. A hook part 85 is formed at one end of the hook body 81 to hook the connector 70, such as the snap ring 71 from pet collars and pet walking belts and the like; The other end of the hook body 81 forms a journal 86 for mounting a rotary ring 83. The rotary ring 83 is used to connect a webbing 90 or the like, such as ropes, chains, etc. There is also a spring element 84 that acts with the compression force between the hook body 81 and the anti release latch 82 to hold the anti release latch 82 at the position of closing the hook part 85 by its elastic force, so that the hook part 85 and the anti release latch 82 form a closed hole 87, which is interlocked with the snap ring 71 to achieve the purpose of connection.

FIG. 2 shows the profile of another swivel snap hook 80a, which is essentially the same as the above swivel snap hook 80, also comprises a hook body 81a included by a hook part 85a and a journal 86a, an anti release latch 82a for opening and closing supporting the hook part 85a, a rotary ring 83a for keeping the journal 86a rotating, and a spring element 84a supporting between the hook body 81a and the anti release latch 82a. The difference between the two swivel snap hooks 80 and 80a is that the anti release latch 82a of the latter is hinged on the hook body 81a to swing, the spring element 84a is a torsion spring acting with torsional force, and the anti release latch 82a is usually maintained the position to close the hook part 85a by its elastic force to define a closed hole 87a that is interlocked with the snap ring 71.

The anti release latches 82 and 82a of the above swivel snap hooks 80 and 80a are both provided with an obvious latch handles 88 and 88a protruding outwards to manual operation, so that the anti release latches 82 and 82a move in the same direction as the latch handles 88 and 88a to open and close the swivel snap hooks. However, the protruding latch handles 88 and 88a can easily be maloperated by the snap ring 71 or other external forces, which will automatically open the anti release latches 82 and 82a, leaving the hook parts 85 and 85a open, causing the snap ring 71 to fall off and lose its connection.

For example, the inventor, based on the user feedback and market research, found that when the swivel snap hook 80 was used for pet restraint, the snap ring 71 could be easy to squeeze the latch handle 88 to the right. As a result, the pet that was fastened is likely to fall off and rush out suddenly due to this accident, resulting in high-risk incidents such as being hit by a car or even biting passers-by.

SUMMARY OF THE INVENTION

In view of shortcomings of the lock catch structure in the prior art, the invention provides a safety lock catch, which can effectively prevent the rope belt and buckle ring, etc. from falling off, and has higher safety.

To achieve the above purpose, the invention provides the following technical solutions:

a safety lock catch, which comprises a lock body, a lock bolt, a force component and a thumb wheel; the lock body comprises a mounting portion and a hook portion, the hook portion has a first end and a second end, the first end is connected with the mounting portion, the second end is bent toward the mounting portion and there is a gap between the second end and the mounting portion, and a chamber is provided in the mounting portion; one end of the lock bolt is inserted into the chamber, and the lock bolt has a first position and a second position; in the first position, the gap is blocked by the lock bolt, and a closed ring is formed by the hook portion and a part of the lock bolt; in the second position, the lock bolt is separated from the hook portion; The force component is used to keep the lock bolt in the first position under normal conditions; The thumb wheel is pivotally connected with the mounting portion, the thumb wheel is engaged with the lock bolt, and the lock bolt can be moved from the first position to the second position by drive the thumb wheel.

In some embodiments, a plurality of slots are provided by the lock bolt, the plurality of slots are spaced along the length direction of the mounting portion, a plurality of gear teeth are provided by the thumb wheel, and the gear teeth cooperate with the slots to achieve the engagement of the thumb wheel and the lock bolt.

In some embodiments, two lugs are provided by the side of the mounting portion, and the thumb wheel is arranged between the lugs; the safety lock catch also contains a pin shaft, a pin hole is provided by the thumb wheel, the pin shaft is inserted into the pin hole, and the two ends of the pin shaft are respectively connected with the two lugs.

In some embodiments, the plurality of the gear teeth are distributed in an annular array with the pin hole as the center, an anti slip surface is arranged on the peripheral wall of the thumb wheel, an anti slip rib is provided by the anti slip surface, and the pin hole is arranged between the gear teeth and the anti slip surface.

In some embodiments, the anti slip surface is a curved surface with the pin hole as the center, and the diameter of the anti slip surface is greater than the diameter of the top circle of the gear teeth.

In some embodiments, a clamping groove is further provided by the mounting portion, the clamping groove is connected with the chamber; the end of the clamping groove far from the hook portion penetrates the mounting portion, and a clamping block that can slide in the clamping groove is provided in the peripheral wall of the lock bolt.

In some embodiments, a connection is further included in the safety lock catch; a ring groove is provided by one end of the mounting portion far from the hook portion, and a counterbore is provided by one end of the connection; in which, the end of the mounting portion far from the hook portion is inserted into the counterbore, part of the connection is stuck in the ring groove, and a threading hole is provided by the connection.

In some embodiments, the force component is a press spring, the press spring is located in the said chamber, and one end of the press spring is in contact with the lock bolt.

In some embodiments, the force component is a torsion spring, the torsion spring is sheathed on the pin shaft, one end of the torsion spring is connected with the thumb wheel, and the other end of the torsion spring is connected with the lugs.

In some embodiments, the force component includes a first magnetic block and a second magnetic block, the first magnetic block is embedded at the end of the lock bolt adjacent to the second end, and the second magnetic block is embedded at the end of the second end adjacent to the lock bolt, the magnetic poles of the first magnetic block and the second magnetic block are opposite.

The safety lock catch provided by the invention adopts a new structure. When the safety lock catch provided by the invention is used, it is difficult for the rope belt or buckle ring to act on the thumb wheel and drive the thumb wheel to rotate in the direction of opening the safety lock catch. Therefore, the safety lock catch provided by the invention is not easy to fall off from the rope belt or buckle ring, and has higher safety.

In addition, in the prior art, when the rope belt or buckle ring extrudes the latch handle on the swivel snap hook in a certain direction, the swivel snap hook will be opened; however, when the rope belt or buckle ring acts on the thumb wheel on the safety lock catch in the same way, the safety lock catch provided by the invention will lock more tightly, so as to further ensure that the safety lock catch will not fall off from the rope belt or buckle ring during use.

BRIEF DESCRIPTION OF THE DRAWING

In order to more clearly explain the technical solution in the embodiments of the invention or in the prior art, the following will briefly introduce the drawings needed in the embodiments or in the prior art. Obviously, the drawings in the following description are only some embodiments of the invention. For ordinary technicians in the art, other drawings can also be obtained from these drawings without creative effort.

It should be understood that the elements shown in the figure are intended to be simple and clear. In commercially feasible embodiments, in order to reduce obstacles in the view, there may be some useful or necessary elements that belong to the well-known content that are not shown in the figure.

Figure 1:
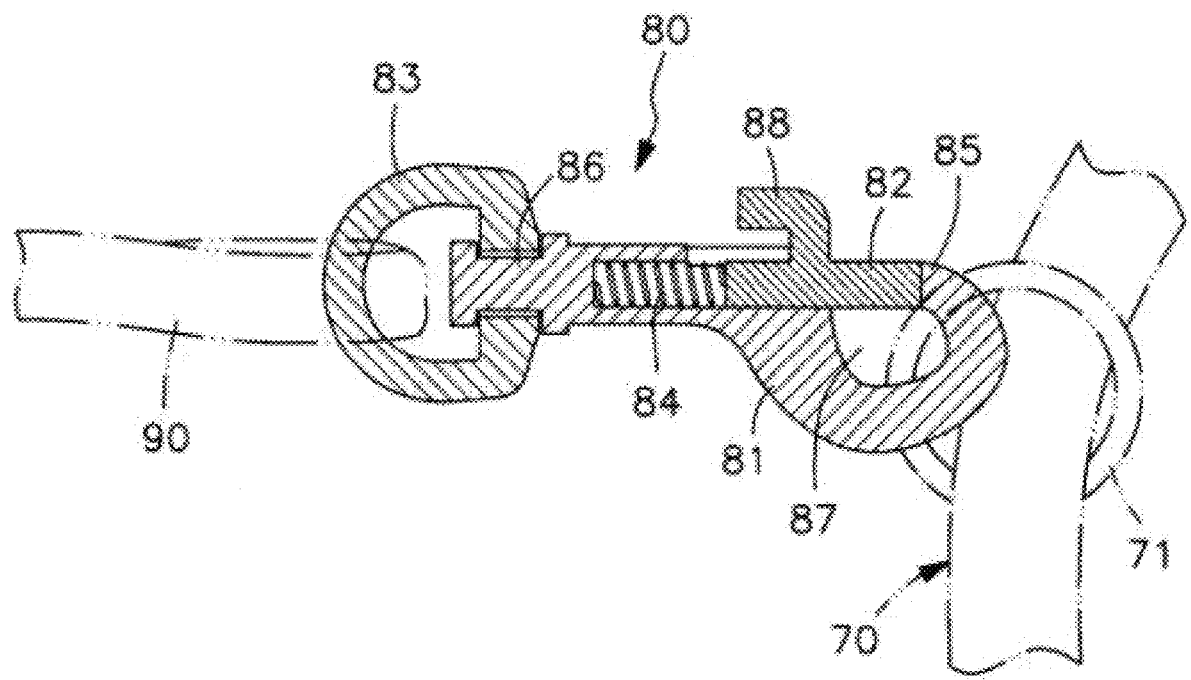
FIG. 1 illustrates a structure diagram of a swivel snap hook in the prior art.
Figure 2:
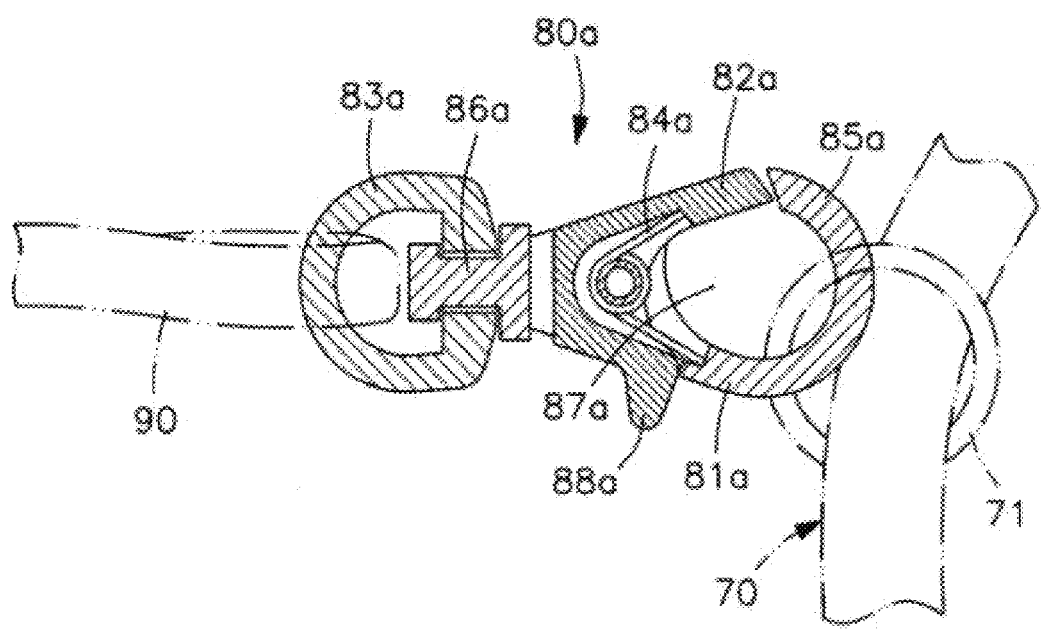
FIG. 2 illustrates a structure diagram of another swivel snap hook in the prior art.
Figure 3:
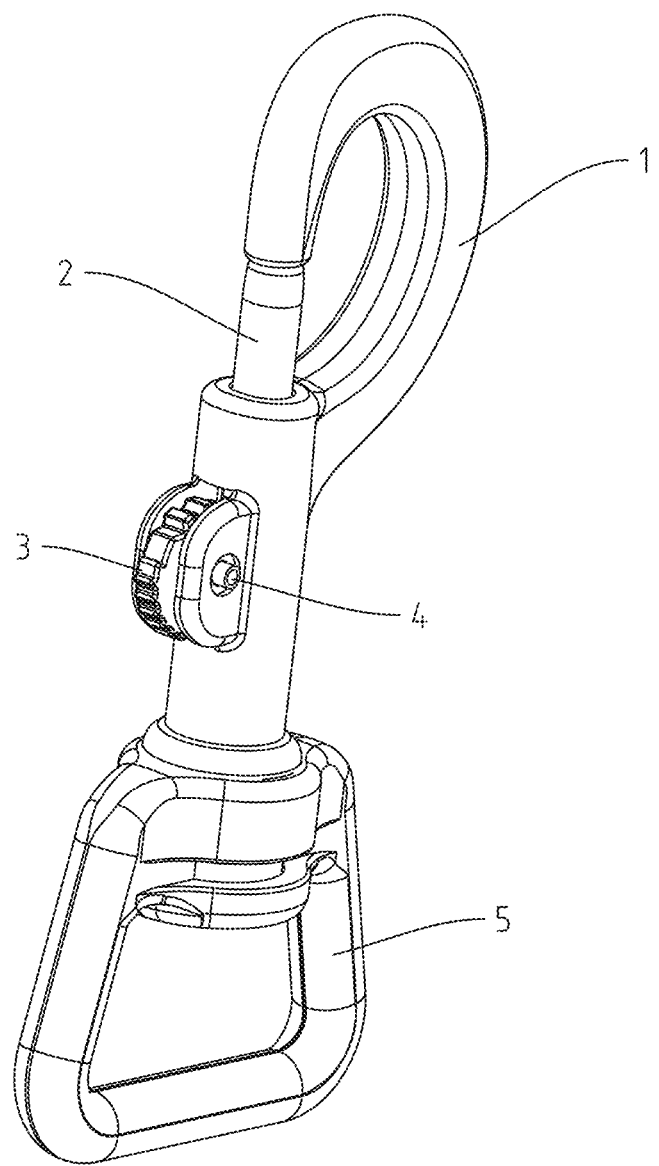
FIG. 3 illustrates a perspective view of Embodiment 1 of the present invention.

The drawing marks are described as follows:

In the figure: 1. lock body; 11. mount portion; 111. ring groove; 112. chamber; 113. clamping groove; 12. hook portion; 121. first end; 122. second end; 13. lug; 14. gap; 2. lock bolt; 21. slots; 22. clamping block; 3. thumb wheel; 31. gear teeth; 32. anti slip surface; 33. pin hole; 4. pin shaft; 5. connection; 51. threading hole; 52. counterbore; 53. notch; 54. deformation portion; 6. press spring; 7. torsion spring; 8. the first magnetic block; 9. the second magnetic block.

SPECIFIC EMBODIMENTS

Various aspects of the invention are further detailed below.

Unless otherwise defined or stated, all technical and scientific terms used herein have the same meaning as those skilled in the art. In addition, any methods and materials similar or equal to the described herein can be applied to the method of the invention.

Terms are described below.

Unless otherwise stated and limited, the "or" used herein includes the relationship between "and". The "and" is equivalent to the Boolean logical operator "AND", the "or" is equivalent to the Boolean logical operator "OR", and "AND" is a subset of "OR".

The terms used herein are used to describe specific embodiments only, not to limit the application. As used herein, the singular form of the article may also include the plural form, unless the context clearly indicates another case. Further, when "include" and/or "compose" are used in the specification, specify the existence of the stated features, steps, operations, elements and/or components only, but do not preclude the existence or addition of one or more other features, steps, operations, elements, components and/or components thereof. Terms such as "above" and "below" are used to indicate the relative position relationship between elements or structures, rather than the absolute position.

The embodiments of the invention are described below through specific examples, so that those skilled in the art can easily understand other advantages and effects of the invention from the contents disclosed in the specification. Obviously, the described embodiments are only part of the embodiments of the invention, not all of them. The invention can also be implemented or applied in different specific embodiments, and various details in the specification can also be modified or changed based on different views and applications without departing from the spirit of the invention. It should be noted that the following embodiments and the features in the embodiments can be combined with each other without conflict. Based on the embodiments in the invention, all other embodiments obtained by those of ordinary skilled in the art without creative efforts shall fall within the scope of the invention.

It should be noted that various aspects of embodiments within the scope of the appended claims are described below. It should be apparent that the aspects described herein can be embodied in a wide variety of forms, and any specific structure and/or function described herein is illustrative only. Based on the invention, those skilled in the art should understand that one aspect described herein can be implemented independently of any other aspect, and two or more of these aspects can be combined in various ways. For example, the apparatus and/or the method of practice may be implemented using any number of aspects set forth herein. In addition, the apparatus and/or the method may be implemented using other structures and/or functionality other than one or more of the aspects described herein.

It should also be noted that the diagrams provided in the following embodiments only illustrates the basic concept of the invention in a schematic way. The diagrams only shows the components related to the invention rather than drawing according to the number, shape and size of components in actual implementation. The type, quantity and proportion of components in actual implementation can be changed at will, and the layout of components may be more complex.

In addition, in the following description, specific details are provided to facilitate a thorough understanding of the examples. However, those skilled in the art will understand that the aspects can be implemented without these specific details.

Embodiment 1

Figure 4:
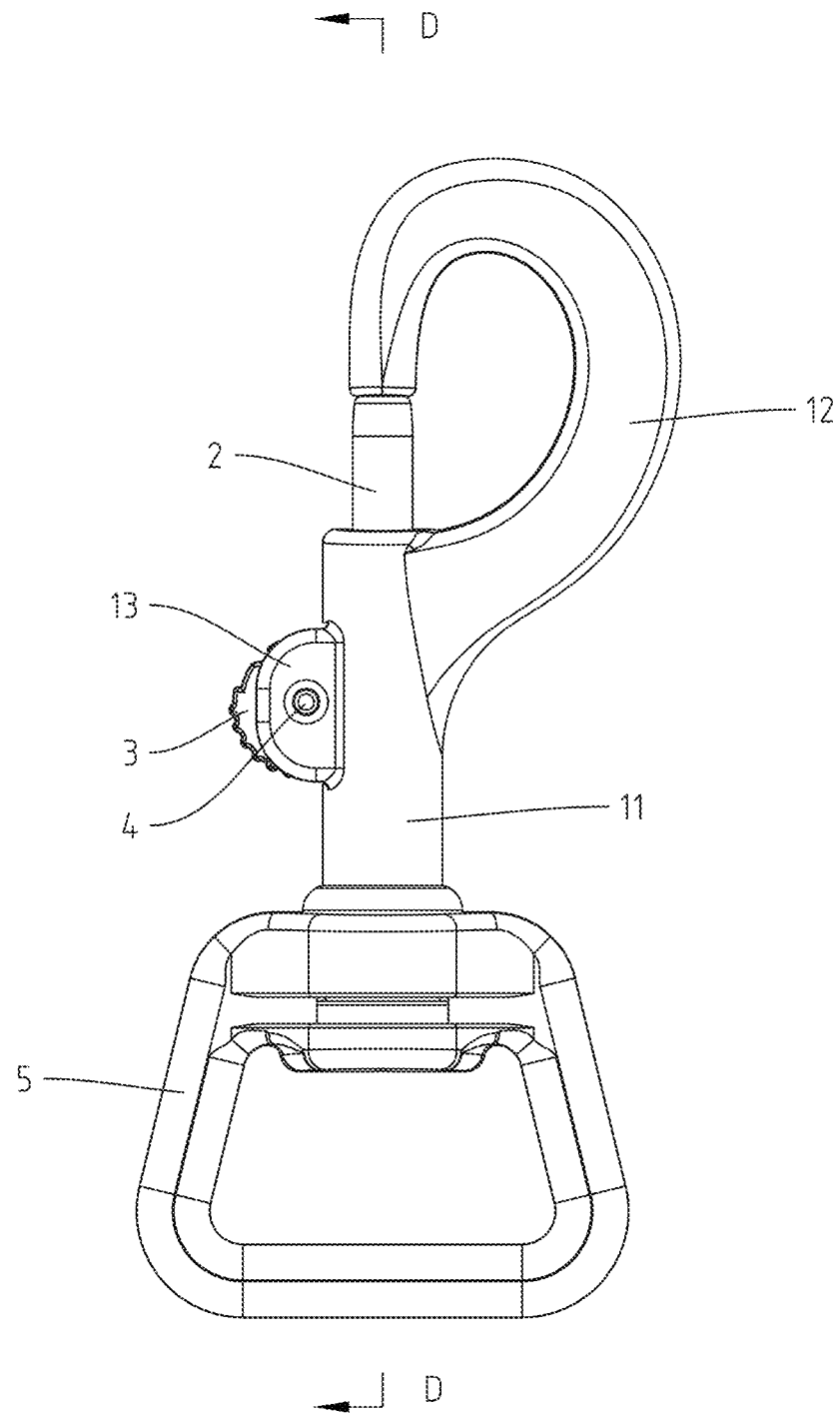
FIG. 4 illustrates a front view of Embodiment 1 of the present invention.
Figure 10:
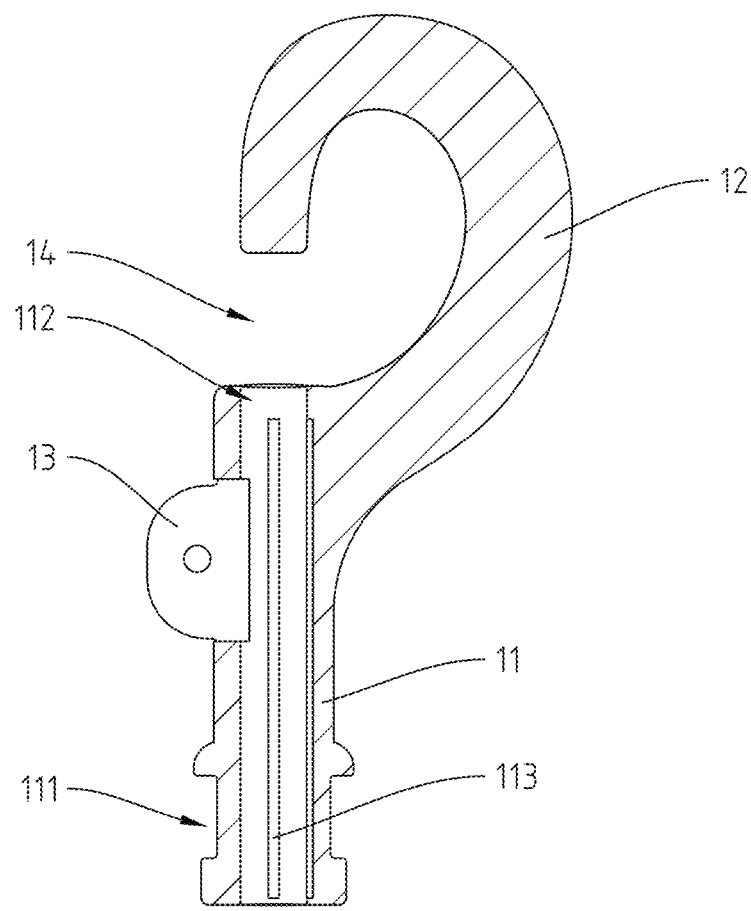
FIG. 10 illustrates a sectional view along line C-C in FIG. 9.
Figure 11:
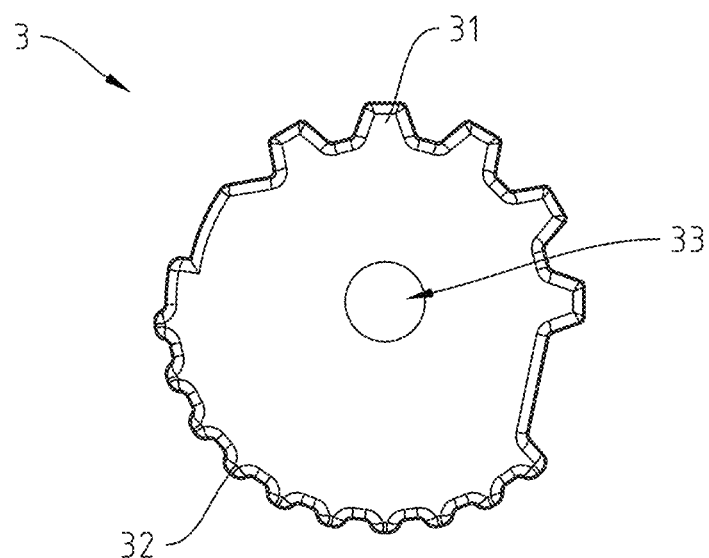
FIG. 11 illustrates a front view of the thumb wheel in Embodiment 1 of the present invention.
Figure 15:
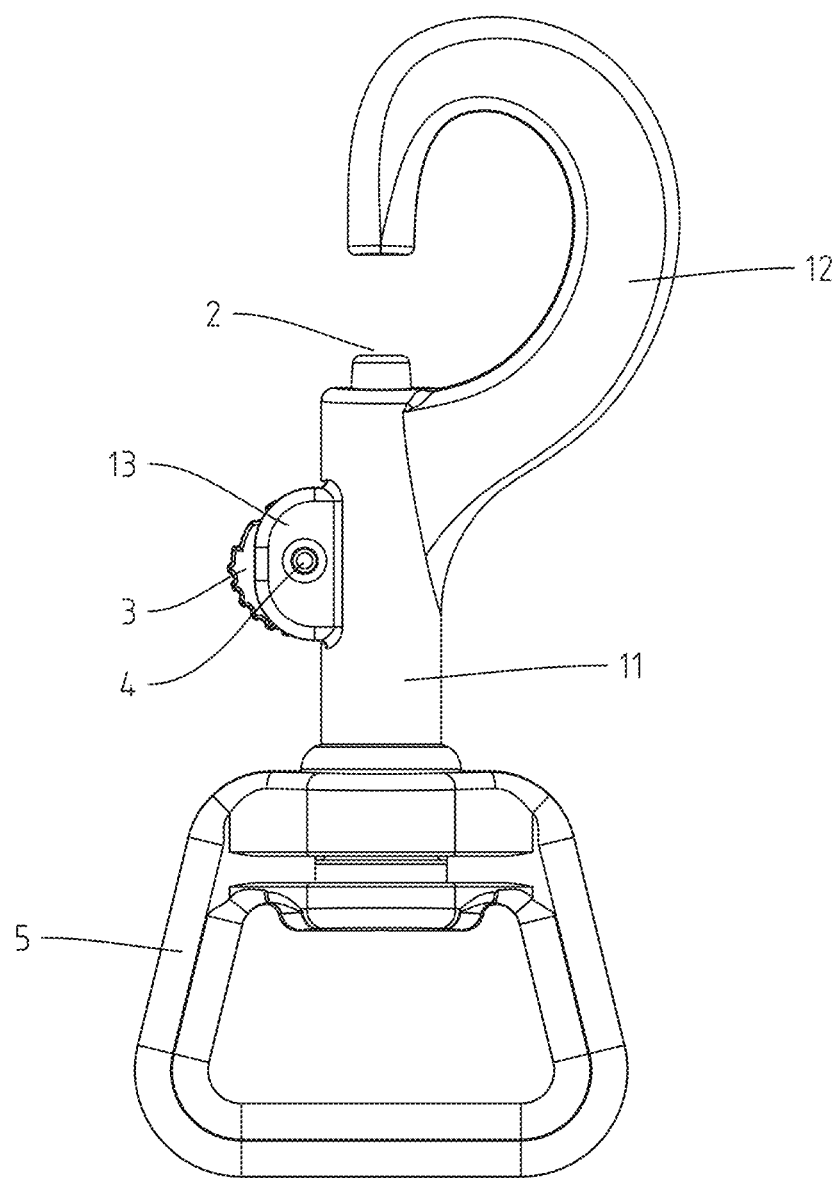
FIG. 15 illustrates a front view of the lock bolt in the second position in Embodiment 1 of the present invention.

As shown in FIGS. 3 to 14, a safety lock catch is provided in the invention, which comprises a lock body 1, a lock bolt 2, a force component and a thumb wheel 3. The lock body 1 comprises a mounting portion 11 and a hook portion 12, the hook portion 12 has a first end 121 and a second end 122, the first end 121 is connected with the mounting portion 11, the second end 122 is bent toward the mounting portion 11 and there is a gap 14 between the second end 122 and the mounting portion 11, and a chamber 112 is provided in the mounting portion 11; as shown in FIG. 10, the chamber 112 passes through the upper and lower ends of the mounting portion 11; the lower end of the lock bolt 2 is inserted into the chamber 112, and the lock bolt 2 has a first position and a second position; as shown in FIG. 4, the lock bolt 2 is in the first position at the time, the gap 14 is blocked by the lock bolt 2, and a closed ring is formed by the hook portion 12 and a part of the lock bolt 2; as shown in FIG. 15, the lock bolt 2 is in the second position at the time, the lock bolt 2 is separated from the hook portion 12; The force component is used to keep the lock bolt 2 in the first position under normal conditions; the thumb wheel 3 is pivotally connected with the mounting portion 11, the thumb wheel 3 is engaged with the lock bolt 2, and the lock bolt 2 can be moved from the first position to the second position by drive the thumb wheel 3.

Figure 5:
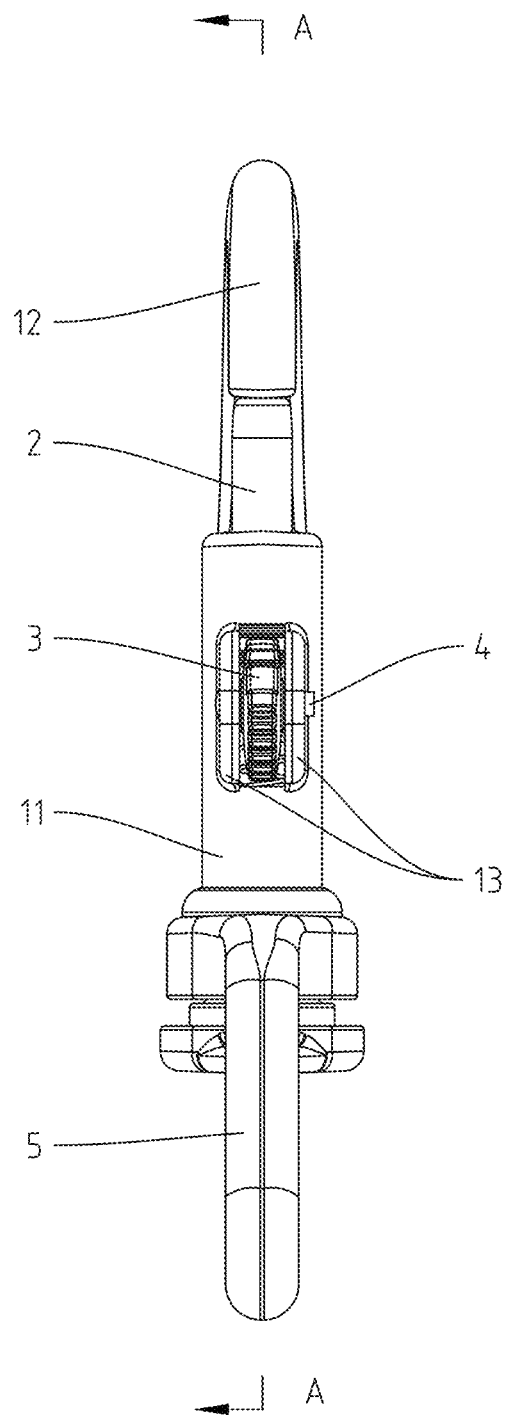
FIG. 5 illustrates a left view of Embodiment 1 of the present invention.

In this embodiment, six slots 21 are provided by the lock bolt 2, six slots 21 are spaced along the length direction of the mounting portion 11, five gear teeth 31 are provided by the thumb wheel 3, and the gear teeth 31 cooperate with the slots 21 to achieve the engagement of the thumb wheel 3 and the lock bolt 2. It should also be noted that in other embodiments, the number of slots 21 and gear teeth 31 can be other quantities. As shown in FIG. 5, two lugs 13 are provided by the side of the mounting portion 11, and the thumb wheel 3 is arranged between the two lugs 13. The lugs 13 can cover most of the thumb wheel 3, thus preventing the rope belt or the buckle ring from touching the thumb wheel 3 by mistake, which is conducive to further improving the safety of the safety lock catch. The safety lock catch also contains a pin shaft 4, a pin hole 33 is provided by the thumb wheel 3, the pin shaft 4 is inserted into the pin hole 33, and the two ends of the pin shaft 4 are respectively connected with the two lugs 13. When the thumb wheel 3 is installed in this way, the thumb wheel 3 has better stability.

In this embodiment, five gear teeth 31 are distributed in an annular array with the pin hole 33 as the center, when the thumb wheel 3 rotates around the pin shaft 4, the five gear teeth 31 can be matched with the corresponding slots 21 in order to drive the lock bolt 2 to move up or down. An anti slip surface 32 is arranged on the peripheral wall of the thumb wheel 3, an anti slip rib (or anti slip embossing) is provided by the anti slip surface 32, and the pin hole 33 is arranged between the gear teeth 31 and the anti slip surface 32. In order to move the thumb wheel 3, the anti slip surface 32 needs to be protruded out of the lugs 13. In other words, the anti slip surface 32 is in a position that can be touched by fingers. The main purpose of the anti slip surface 32 is to increase the roughness of the edge of the thumb wheel 3, so as to prevent slipping when the thumb wheel 3 is moved by fingers. As a preferred embodiment, the anti slip surface 32 is a curved surface with the pin hole 33 as the center, and the diameter of the anti slip surface 32 is greater than the diameter of the top circle of the gear teeth 31, so as to ensure that the user can easily move the thumb wheel 3 to achieve the purpose of labor saving.

Figure 8:
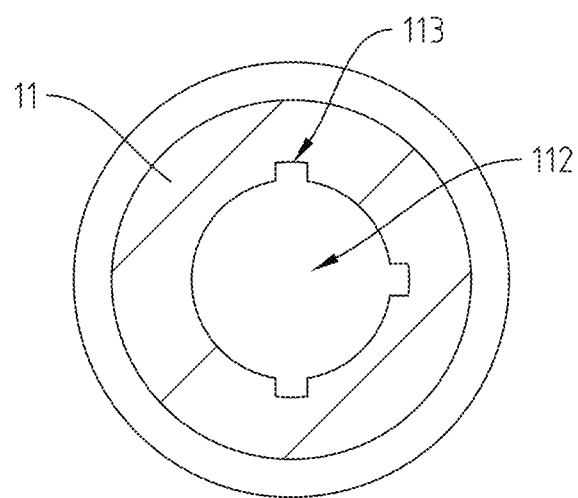
FIG. 8 illustrates a sectional view along line B-B in FIG. 7.
Figure 9:
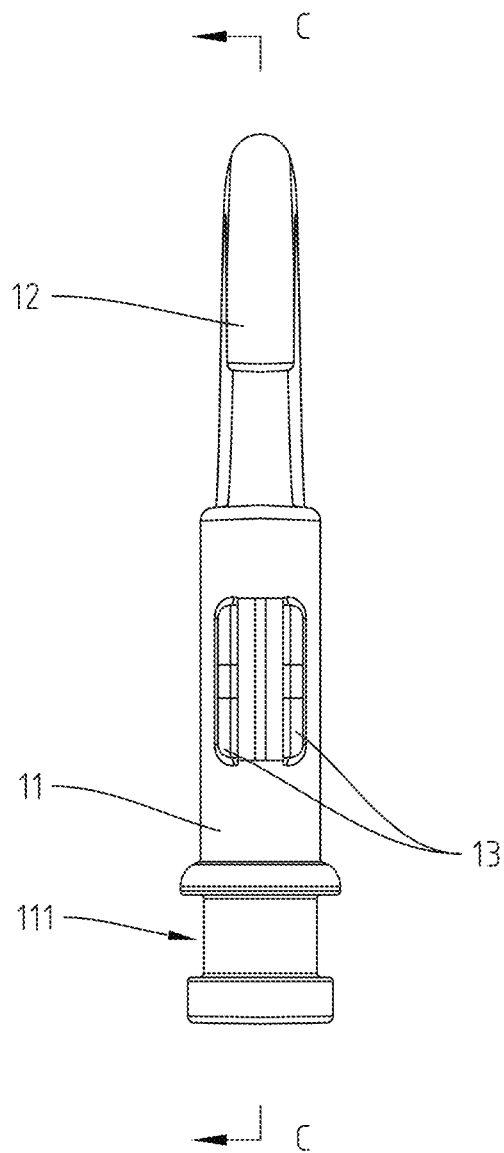
FIG. 9 illustrates a left view of the lock body in Embodiment 1 of the present invention.
Figure 12:
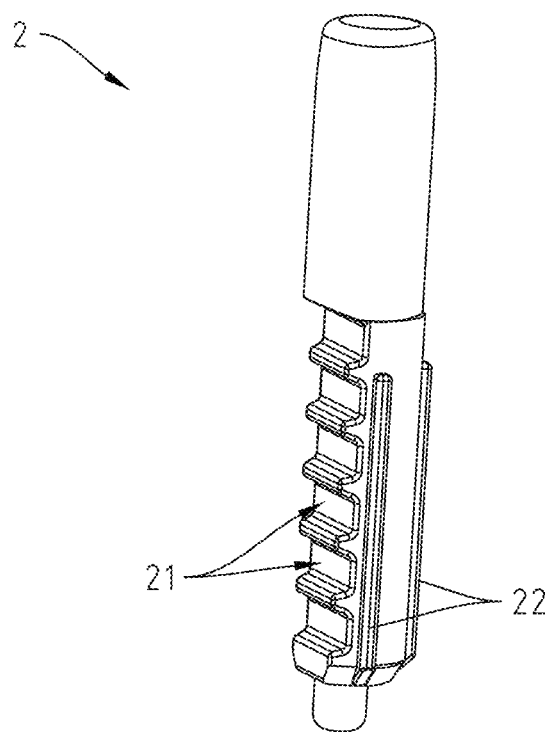
FIG. 12 illustrates a structure diagram of the lock bolt in Embodiment 1 of the present invention.

In this embodiment, a clamping groove 113 is further provided by the mounting portion 11, the clamping groove 113 is connected with the chamber 112; the end of the clamping groove 113 far from the hook portion 12 penetrates the mounting portion 11, and a clamping block 22 that can slide in the clamping groove 113 is provided in the peripheral wall of the lock bolt 2. As shown in FIGS. 8 and 12, the clamping groove 113 and the clamping block 22 are three. With the clamping block 22 being matched with the clamping groove 113, the lock bolt 2 can be prevented from rotating in the chamber 112, so as to ensure that the gear teeth 31 can be well matched with the slots 21.

Figure 6:
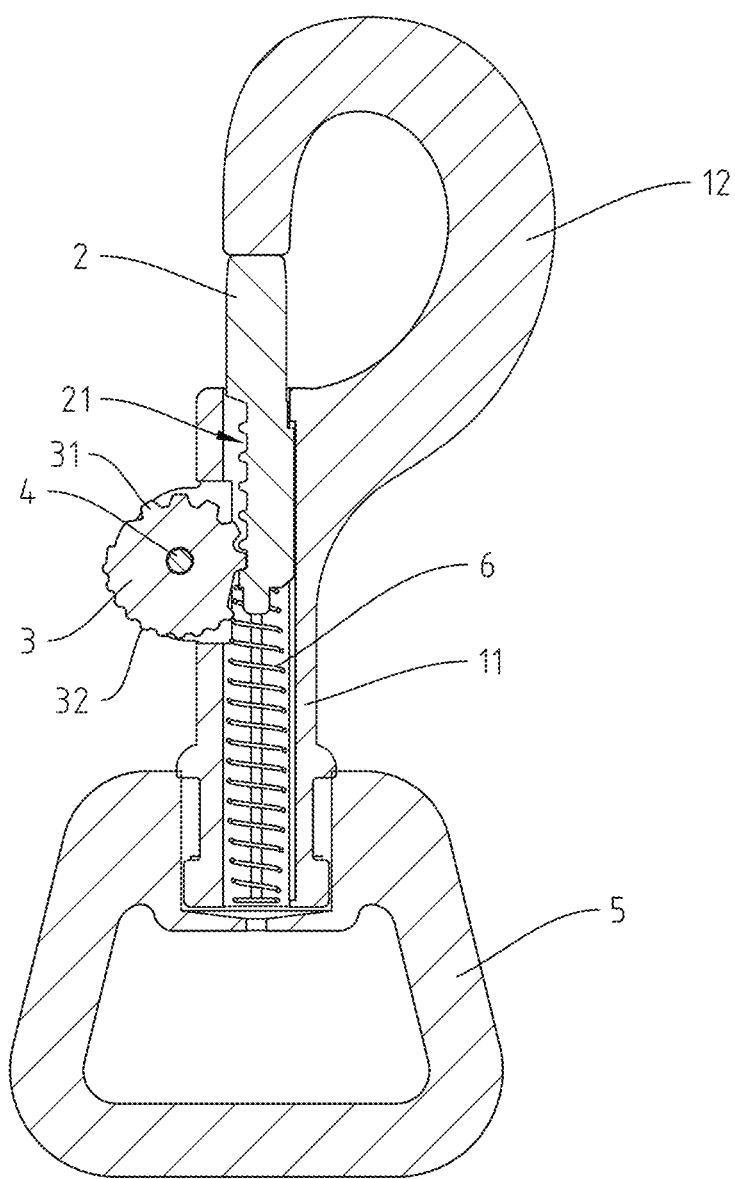
FIG. 6 illustrates a sectional view along line A-A in FIG. 5.
Figure 7:
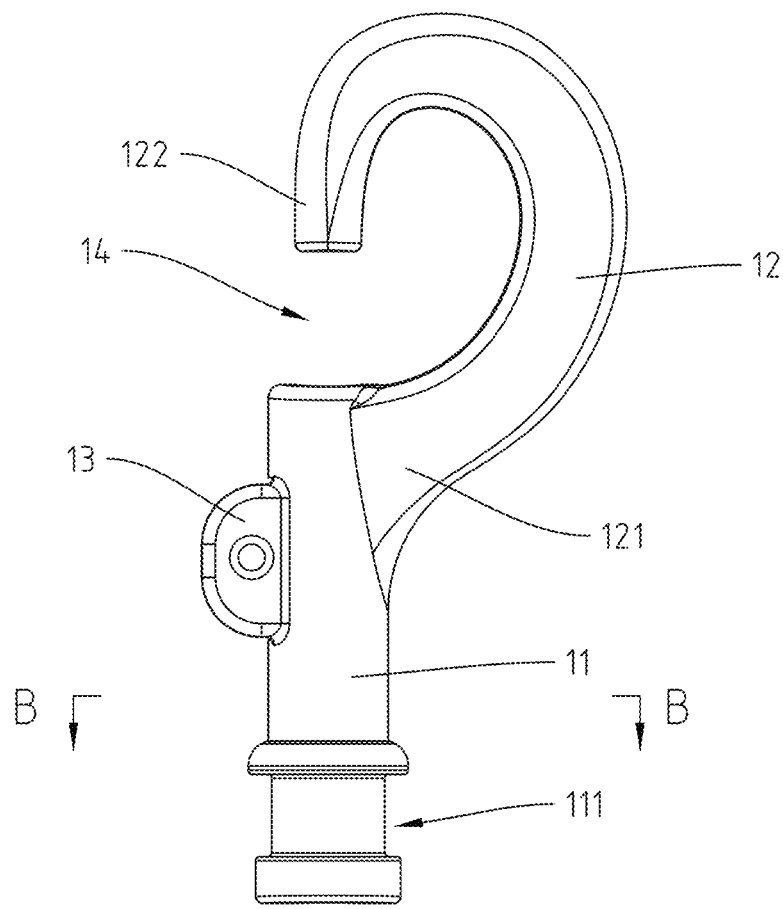
FIG. 7 illustrates a front view of the lock body in Embodiment 1 of the present invention.
Figure 13:
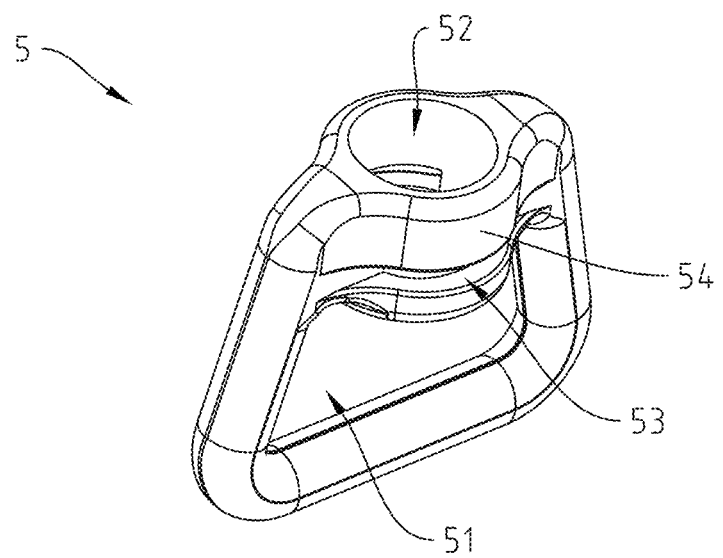
FIG. 13 illustrates a structure diagram of the connection in Embodiment 1 of the present invention.
Figure 14:
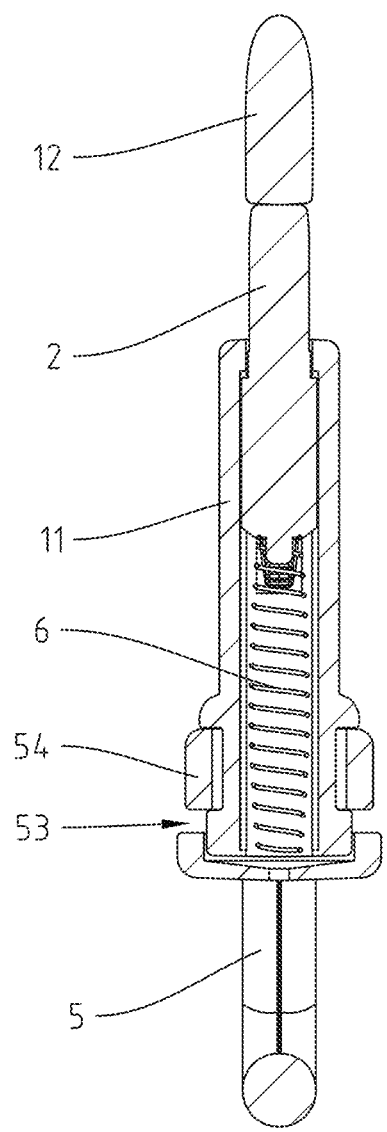
FIG. 14 illustrates a sectional view along line D-D in FIG. 4.

In order to connect the safety lock catch to the rope, the safety lock catch further included a connection 5. As shown in FIG. 6 and FIG. 13, a ring groove 111 is provided by one end of the mounting portion 11 far from the hook portion 12, and a counterbore 52 is provided by one end of the connection 5, the end of the mounting portion 11 far from the hook portion 12 is inserted into the counterbore 52, part of the connection 5 is stuck in the ring groove 111, and a threading hole 51 is provided by the connection 5. In specific implementation, a notch 53 is arranged on the front and back of the connection 5, and the notch 53 is connected with the counterbore 52. Thus, a deformation portion 54 that is easy to deform is formed on the upper end of the connection 5. After the mounting portion 11 is inserted into the counterbore 52, the deformation portion 54 is stuck in the ring groove 111 by the squeezing of a stamping device (see FIG. 14), so that the connection 5 can be prevented from falling off from the mounting portion 11.

In this embodiment, the force component is a press spring 6, which is located in the chamber 112, and one end of the press spring 6 is in contact with the lock bolt 2, the other end of the press spring 6 can be fixed connected with the lower end of the mounting portion 11 or directly pressed on the connection 5. As shown in FIG. 6, the press spring 6 is in a compressed state at the time, and the press spring 6 provides an upward thrust to the lock bolt 2, so that the upper end of the lock bolt 2 is in close contact with the second end 122 of the hook portion 12.

As shown in FIG. 4 and FIG. 6, when the safety lock catch provided in this embodiment can only be opened if needed, the thumb wheel 3 can be rotated clockwise with finger. At the same time, the lock bolt 2 moves downward, the press spring 6 retracts, the upper end of the lock bolt 2 is separated from the hook portion 12, and the gap 14 between the second end 122 on the hook portion 12 and the upper end of the mounting portion 11 is opened, and then the safety lock catch can be easily hung on the rope. After the safety lock catch is hung on the rope, the finger is removed from the thumb wheel 3, and then the elastic force of the press spring 6 pushes the lock bolt 2 upward until the upper end of the lock bolt 2 contacts the second end 122 of the hook portion 12 (that is, the lock bolt 2 returns to the first position).

As shown in FIG. 4 and FIG. 6, the thumb wheel 3 in the invention can only be opened when it rotates clockwise. However, in actual use, it is difficult for the rope belt or buckle ring to act on the thumb wheel 3 and make the thumb wheel 3 rotate in a clockwise direction. Therefore, the safety lock catch provided by the invention is not easy to fall off when in use, and has higher safety. Moreover, when the rope belt or the buckle ring extrudes the thumb wheel 3 downward, the safety lock catch is locked more tightly, thus further ensuring that the safety lock catch will not fall off from the rope belt or the buckle ring during use.

Embodiment 2

Figure 16:
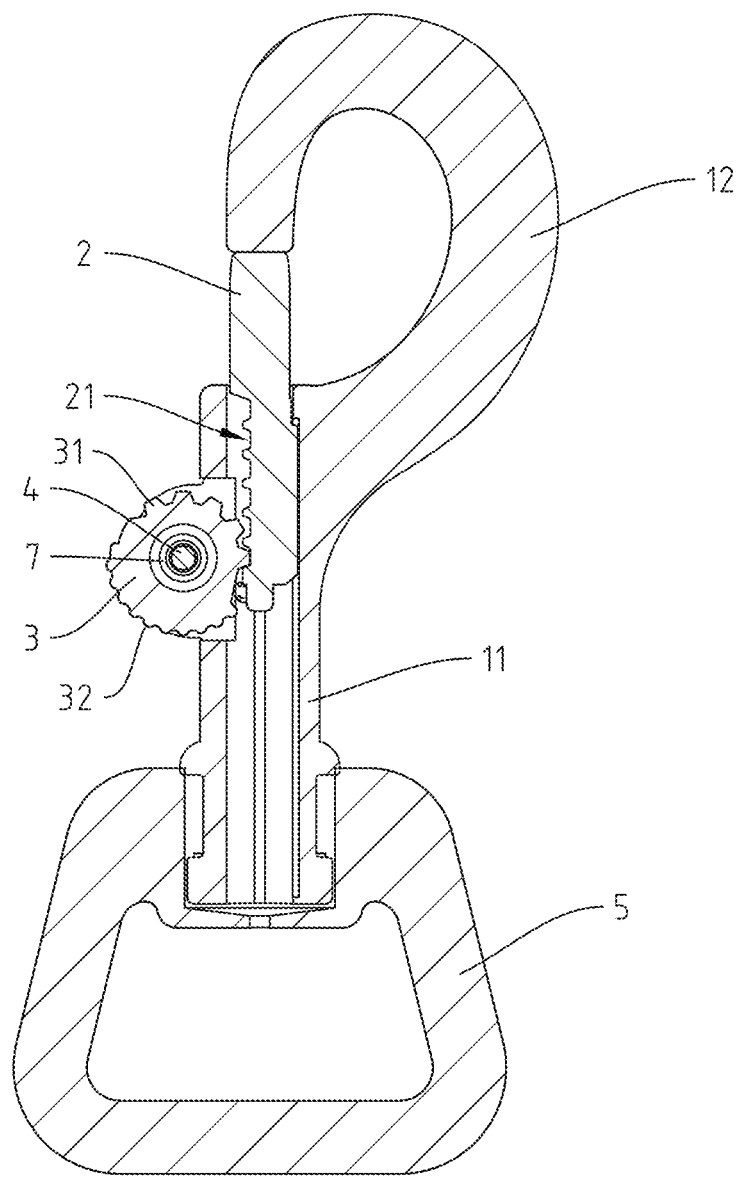
FIG. 16 illustrates a sectional view of Embodiment 2 of the present invention.

The difference between this embodiment and embodiment 1 is that the force component in this embodiment is a torsion spring 7, and the installation position of the force component has also changed adaptively. This embodiment can achieve the same technical effect as embodiment 1. As shown in FIG. 16, the torsion spring 7 is sleeved on the pin shaft 4, one end of the torsion spring 7 is connected with the thumb wheel 3, and the other end of the torsion spring 7 is connected with the lugs 13. The torsion spring 7 always provides a force to drive the thumb wheel 3 to rotate counterclockwise, so that the lock bolt 2 is normally in the first position.

Embodiment 3

Figure 17:
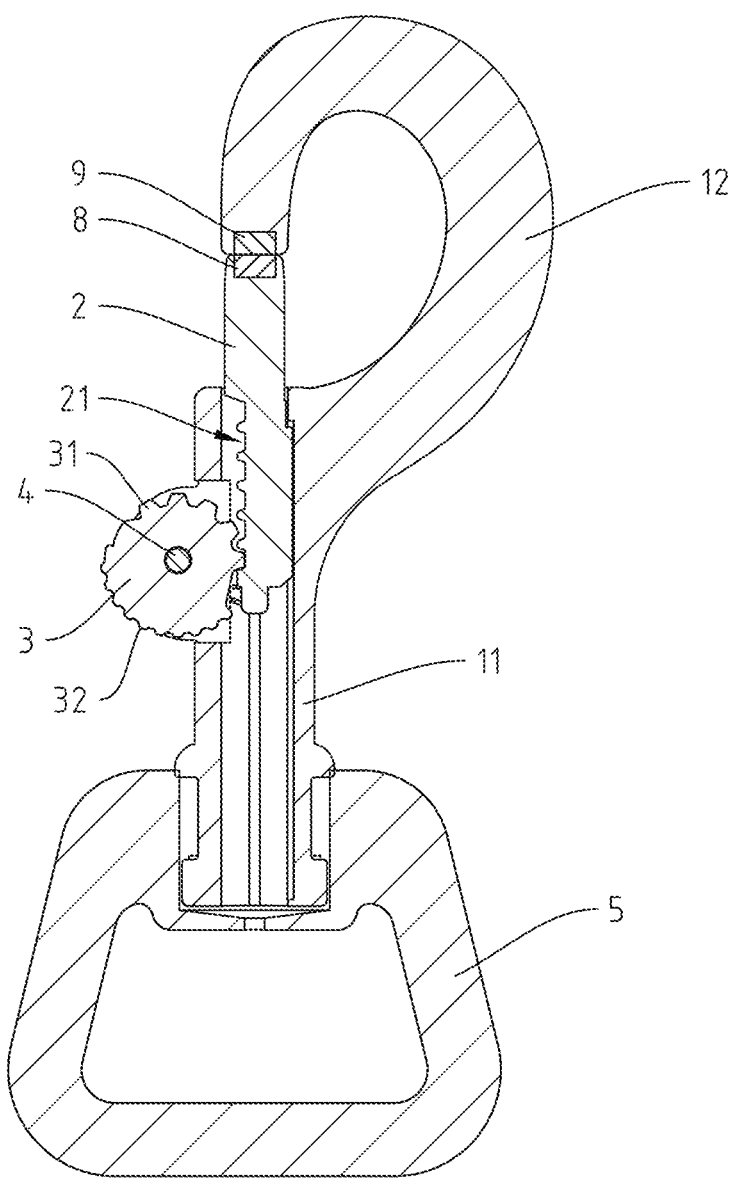
FIG. 17 illustrates a sectional view of Embodiment 3 of the present invention.

The difference between this embodiment and embodiment 1 is that another force component is used. As shown in FIG. 17, the force component in this embodiment includes the first magnetic block 8 and the second magnetic block 9. The first magnetic block 8 and the second magnetic block 9 are both permanent magnets. The first magnetic block 8 is embedded in the upper end of the lock bolt 2, the second magnetic block 9 is embedded in the lower end of the second end 122, and the magnetic poles of the first magnetic block 8 and the second magnetic block 9 are opposite. Normally, the first magnetic block 8 and the second magnetic block 9 attract each other to keep the lock bolt 2 in the first position.

The examples of embodiments of the application herein are intended to provide an overall understanding of multiple embodiments, not a complete description of all elements and features of devices and systems that may use the techniques of the application. Based on the implication herein, many other embodiments will become apparent or will be derived from to those skilled in the art, so that structural and logical replacements and changes can be made without deviating from the scope disclosed in the application. The drawings are also representative and are not drawn to scale. Therefore, both the specification and the drawings should be regarded as illustrative rather than restrictive.

The equivalent of the corresponding structure, material, act and all the steps defined by the method or functionality in the claim is intended to include any structure, material or act for performing functions in combination with other elements of the specific claim. The description of various embodiments is proposed for the purpose of explanation and description, but it is not intended to be exhaustive or limited to the form disclosed. Without deviating from the scope and spirit of the application, many modifications and changes are apparent to ordinary skilled in the art. These embodiments are selected and described in order to best explain the principles and practical applications of the application, and enable ordinary skilled in the art to understand various embodiments and make various modifications to the particular use.

The purpose of submitting the abstract is to enable the reader to quickly determine the nature of technical disclosure. The abstract is submitted on the understanding that it should not be used to explain or limit the scope or meaning of the claims. In addition, in the previous detailed description, it can be seen that for the purpose of simplifying the invention, various features are grouped into one embodiment. This disclosure method should not be interpreted as reflecting an intention, that is, the required implementation mode is more characteristics than those explicitly stated in each claim. On the contrary, as reflected in the appended claims, the creative subject does not lie in all features of a single embodiment. Therefore, the claims are hereby incorporated into the specification, and each claim stands on its own as the subject of a separate claim protection.

The above is only the specific implementation mode of the invention, but the protection scope of the invention is not limited to this. Any person familiar with the technical field can easily think of changes or replacements within the technical scope disclosed in the invention, which should be covered in the protection scope of the invention. Therefore, the protection scope of the invention shall be subject to the protection scope of the claims.

The invention claimed is:

1. A safety lock catch, is characterized by containing:
   a lock body, the said lock body comprises a mounting portion and a hook portion, the said hook portion has a first end and a second end, the said first end is connected with the said mounting portion, the said second end is bent toward the said mounting portion and there is a gap between the said second end and the said mounting portion, and a chamber is provided in the said mounting portion;
   a lock bolt, one end of the said lock bolt is inserted into the said chamber, and the said lock bolt has a first position and a second position; in the said first position, the said gap is blocked by the said lock bolt, and a closed ring is formed by the said hook portion and a part of the said lock bolt; in the second position, the said lock bolt is separated from the said hook portion;
   a force component, the said force component is used to keep the said lock bolt in the said first position under normal conditions; the said force component is a press spring or a torsion spring;
   a thumb wheel, the said thumb wheel is pivotally connected with the said mounting portion, the said thumb wheel is engaged with the said lock bolt, and the said lock bolt can be moved from the said first position to the said second position by drive the said thumb wheel;
   a plurality of slots are provided by the said lock bolt, the plurality of slots are spaced along the length direction of the said mounting portion, a plurality of gear teeth are provided by the said thumb wheel, and the said gear teeth cooperate with the said slots to achieve the engagement of the said thumb wheel and the said lock bolt;

two lugs are provided by the side of the said mounting portion, and the said thumb wheel is arranged between the two said lugs; the said safety lock catch also contains a pin shaft, a pin hole is provided by the said thumb wheel, the said pin shaft is inserted into the said pin hole, and the two ends of the said pin shaft are respectively connected with the two said lugs;

the plurality of the said gear teeth are distributed in an annular array with the said pin hole as the center, an anti slip surface is arranged on the peripheral wall of the said thumb wheel, an anti slip rib is provided by the said anti slip surface, and the pin hole is arranged between the said gear teeth and the said anti slip surface;

the said anti slip surface is a curved surface with the said pin hole as the center, and the diameter of the said anti slip surface is greater than the diameter of the top circle of the gear teeth.

2. The safety lock catch as claimed in claim 1, is characterized in that: a clamping groove is further provided by the said mounting portion, the said clamping groove is connected with the said chamber; the end of the clamping groove far from the hook portion penetrates the said mounting portion, and a clamping block that can slide in the said clamping groove is provided in the peripheral wall of the said lock bolt.

3. The safety lock catch as claimed in claim 1, is characterized in that: a connection is further included; a ring groove is provided by one end of the said mounting portion far from the said hook portion, and a counterbore is provided by one end of the said connection; in which, the end of the said mounting portion far from the said hook portion is inserted into the said counterbore, part of the said connection is stuck in the said ring groove, and a threading hole is provided by the said connection.

4. The safety lock catch as claimed in claim 1, is characterized in that: the said press spring is located in the said chamber, and one end of the said press spring is in contact with the said lock bolt.

5. The safety lock catch as claimed in claim 1, characterized in that: the said torsion spring is sheathed on the said pin shaft, one end of the said torsion spring is connected with the said thumb wheel, and the other end of the said torsion spring is connected with the said lugs.

* * * * *